(No Model.)
J. SOLTER.
CAN SOLDERING MACHINE.
No. 386,759. Patented July 24, 1888.
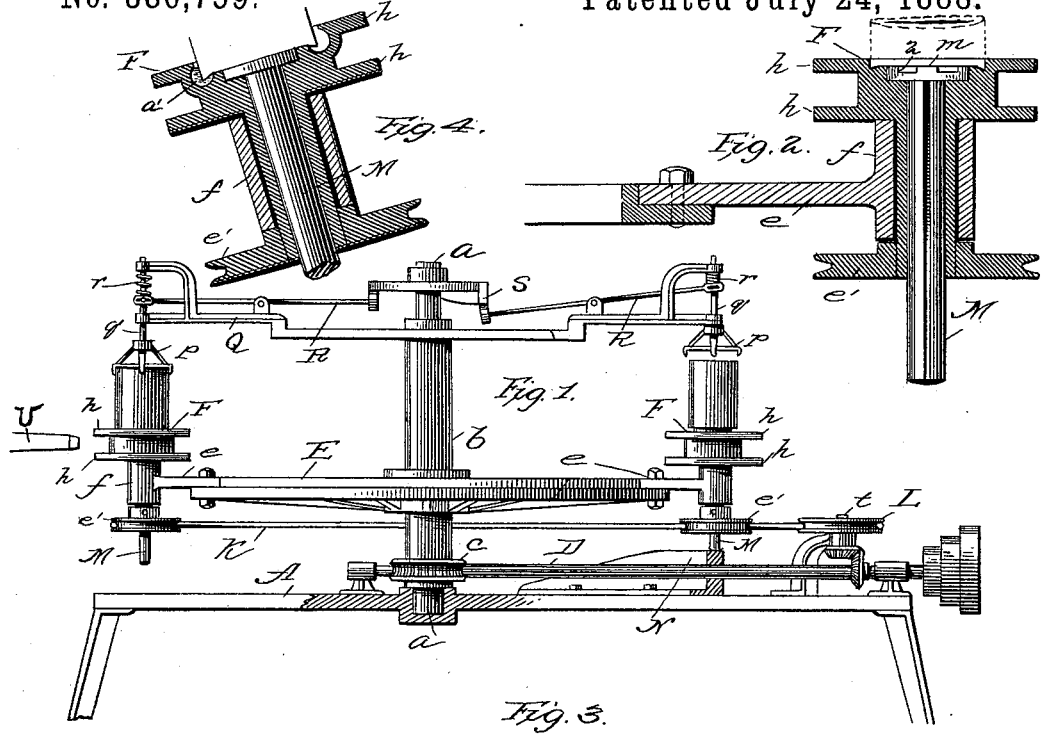
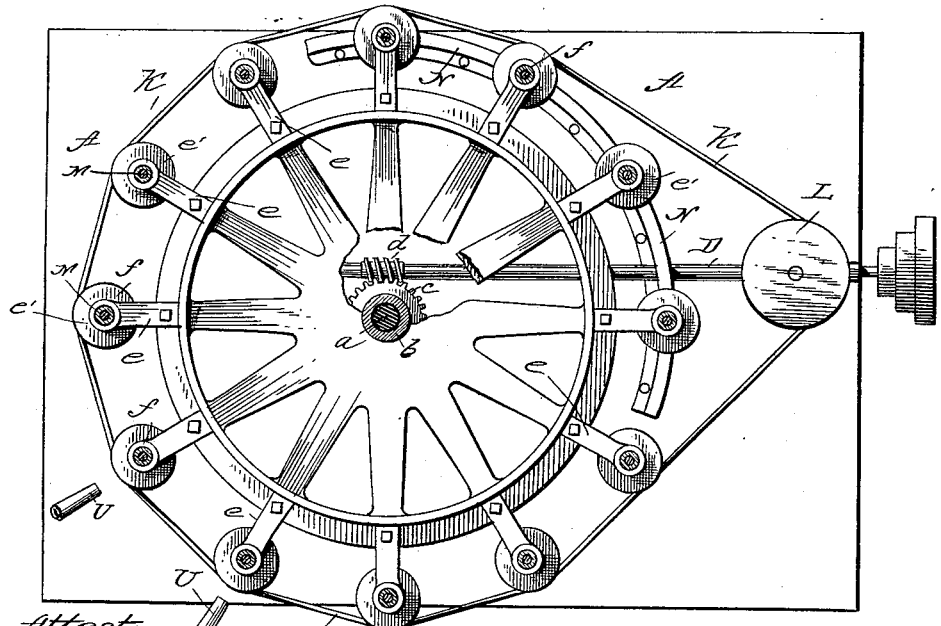
Attest
Hallett Donaldson
F. L. Middleton
Inventor
John Solter
by Ellis Spear
Atty.

UNITED STATES PATENT OFFICE.

JOHN SOLTER, OF BALTIMORE, MARYLAND, ASSIGNOR OF ONE-HALF TO GEORGE L. KREBS, OF SAME PLACE.

CAN-SOLDERING MACHINE.

SPECIFICATION forming part of Letters Patent No. 386,759, dated July 24, 1888.

Application filed April 11, 1888. Serial No. 270,302. (No model.)

*To all whom it may concern:*

Be it known that I, JOHN SOLTER, of Baltimore, in the State of Maryland, have invented a new and useful Improvement in Can-Soldering Machines; and I do hereby declare that the following is a full, clear, and exact description of the same.

The invention hereinafter set forth is an improved machine for soldering cans.

The object of the invention is, first, to provide an effective construction whereby a hot plate may be advantageously used to melt the solder, either for inside or outside soldering.

Heretofore cans have been soldered by contact with the hot plate in an experimental way; but one difficulty has been with this manner of soldering, that if the cans were removed from the plate while the solder was in such a fluid condition that it would readily run the solder would become displaced by running from one part to another, so that the soldering would be imperfect in parts.

My object specially is to provide mechanism for raising the can from the hot plate, and, further, for rotating the can, together with the heated plate, for the purpose of applying the solder properly to the can.

My object further is to simplify the construction of the revolving machine to which I have applied my particular form of apparatus above referred to, the improvement relating especially to the parts for turning the heated plate, together with the lifting mechanism by which the cans are raised, at the proper time from contact with the heated plates.

In the accompanying drawings, Figure 1 shows the entire apparatus in side elevation. Fig. 2 shows an enlarged view of the mechanism connected with the heated plate, together with the plate and a portion of the can in place. Fig. 3 shows a plan view of the apparatus represented in Fig. 1. Fig. 4 shows the heated plate and its immediate connection in an inclined position, the plate being formed for outside soldering.

As represented in the drawings, the revolving can-carrier is shown at F. It consists of a disk of metal, of sufficient thickness to retain the heat, with flanges *h* on the edges of the periphery, and a shank, on the lower end of which is a pulley, $e'$, by means of which the can-seat is turned, all as shown in Fig. 2. As these can-carriers are turned, the flame from any suitable burner is directed between the flanges *h*, and thereby the body of the holder is heated sufficiently to melt the solder in contact therewith or lying upon the bottom of the can in contact therewith. The top of the holder is recessed to form the can-seat, this can-seat being of suitable shape to receive the end of the can, of whatever form that may be, so that the edges of the can on that part where the solder is to be applied may be in contact with the metal within this recess which forms the can-seat. Concentric therewith is another recess, sunk lower to receive the head *m* of the splined lifting-bolt M. The head *m* may be cut away on its surface to leave points 2, which bear upon the bottom of the can, as shown in Fig. 2. When the bolt M is down in place, its head lies flush with the can-seat, so that the upper surface of the head or its bearing-points will be in contact with the bottom of the can. The purpose of this bolt is, that when the can has been in contact with the seat a sufficient length of time for properly melting the solder and distributing it upon the seam the bolt shall be lifted and thus the can lifted off its seat in order that the solder may be cooled. The shank of the can-holder is held in a sleeve, *f*, of a bracket, *e*, suitably supported, so that the holder may turn in the sleeve, and for this purpose the pulley $e'$ is fixed to the lower end of the shank.

In the figures, A represents a suitable table for supporting the working parts of the mechanism. On this table is set a post, *a*, fitted in a suitable step, and upon it is a sleeve, *b*, fitted to turn freely. A worm-gear, *c*, is fixed to the lower end, in engagement with a worm, *d*, on the main driving-shaft D. On the sleeve is fixed a revolving table, E, (or it may be a wheel with hub and spokes,) on the arms *e* of which are sockets carrying the can-seats. The table is turned by the worm-gear to carry the can-holders around in a circular path, in part of which are the heating-flames. The arms *e* are set radially and are of any convenient number, (preferably twelve,) and when the table revolves these can-holders all move with slow but constant and uniform motion, instead of the step-by-step movement, as heretofore in machines of this class. The can-holders are turned on their shanks by means of the band K, which is driven by a main pulley, L. The band encircles the series of pulleys on the shanks and turns them independently of the motion of the revolving table and with speed sufficient to properly lay the solder. The cans will be revolved throughout the main part of this revolution of the table; but when they reach the front, where the belt diverges to the main driving-pulley, they cease revolving, and may be removed at this point and fresh unsoldered cans put on. In order that these cans may be lifted out of their seats in the can-holders when they reach this point, I have provided a lifting-segment, N, having an incline, n, fixed on the supporting-table. This is curved on a line with the path of the lifting-bolts, and is located in proper relation to the position where the cans are to be removed and fresh cans replaced. Each bolt rides up the incline, and thereby lifts the can from its seat and allows it to cool; but as each bolt is splined in its shank it turns therewith and continuously turns the can while it is thus lifted. This insures the proper distribution of the solder.

The cans are held firmly down by means of a cap, p, on a spindle, q, held in an arm, Q, on the upper extension of the sleeve which carries the revolving table. The cap is pressed downwardly by a spring, r, (or by its own weight,) and is lifted against the spring-pressure when the can is raised off its seat by the bolt M, so that it is clamped while turning in this raised position. It is further lifted by means of a lever, R, the inner end of which rides under a cam-face on a disk, S, on the vertical standard. This cam-face corresponds in position to the point where the can is to be removed from its seat and another to be put on, and lifts the cap sufficiently for that purpose. The pulley L is mounted on a vertical shaft, t, a bevel-gear on the lower end of which meshes with a bevel-gear on the main shaft. Gasoline or other flame is applied, as at U U, to heat the seats, impinging on the body thereof between the flanges h. A blower for cooling the cans may be placed at any convenient point, if desired.

In operation, the revolving table moves slowly in front of the flames, of suitable number, and directed into the space between the flanges. The comparatively slow revolution of the table and rapid revolution of the can-carriers cause the latter to be subjected to heat on all sides, and they are soon heated sufficiently to melt the solder quickly in the cans placed in their seats. After the cans are thus soldered, and on their return to the point where the can-seat pulleys leave the belt, the cans, having been previously lifted, are discharged sufficiently cooled and with the solder hardened during the revolution.

I have described the machine thus far as adapted for inside soldering; but in Fig. 4 I have shown the can-seat adapted for outside soldering, no other change being required in the machine except to place the holders at an angle and to form a recess for the solder at the edge of the can-seat.

In Fig. 4 I show the recess in the form of an annular channel, a', deeper and wider than the can-seat, thus leaving the lower edge of the can projecting into this annular channel, as shown in the figure. A piece of solder is dropped into the channel, and as it melts under the heat of the iron-carrier it runs to the lowest point, and as the can is revolved the solder remains at this point, while the can is revolved, with its lower edge heated by the iron and passing constantly through the molten solder, which is sweated into the seam. The can on this form of device is lifted and held in the same manner as described in relation to the form and for inside soldering.

I claim as my invention—

1. In combination, a constantly-revolving table carrying a series of revolving can-holders, heaters for the can-holders, and lifting devices for raising the cans from the holders for the purpose of cooling them and allowing the cans to be removed, all substantially as described.

2. In combination with a constantly-revolving table, a series of can-holders mounted on spindles journaled in the table, pulleys on the lower ends of the spindles, and a band encircling the series of pulleys and connected with a main driving-pulley, substantially as described.

3. In combination with a revolving table, a solid can-holder, a heating apparatus arranged to heat the can-holder, said can-holder being provided with a recess on the upper face to receive the can, and with a lifter arranged to lift the can off the heater-seat, substantially as and for the purpose described.

4. In a solid can-holder fitted to turn in a sleeve, a recess in the upper face of the can-holder to receive the can, the pulley on the lower end of the can-holder, and the lifting-pin extending through the can-holder, with means for lifting said pin to raise the can, substantially as described.

5. In combination, a main driving-shaft, a vertical sleeve carried therewith, a table on the sleeve carrying a series of revolving can-holders, a pulley on the spindle of each can-holder, and a band encircling the series of pulleys and driven by another pulley operated by the main shaft, substantially as described.

6. In combination with a series of can-holders mounted on a revolving table, pulleys on the ends of the spindles of the can-holders, and a band encircling them driven from the main shaft through a pulley, lifting-pins in each can-holder, and a cam-segment on the supporting-table for lifting the pins to raise the cans, substantially as described.

7. In combination with a series of can-holders mounted in a revolving table, pulleys on the ends of the spindles of the can-holders, a band encircling them driven from the main shaft, lifting-pins in each can-holder, a cam-segment for lifting the same, a holding-cap for the top of the cans, and a cam-segment for releasing the can from the said cap, substantially as described.

8. In combination with a constantly-revolving table, a series of can-holders mounted on spindles journaled in the table, pulleys on the ends of the spindles of the can-holders, a band encircling them driven from the main shaft, a heating apparatus for the said holder, and a recess in said holder for the can, having an annular channel of greater depth than the recess for outside soldering, substantially as described.

In testimony whereof I have signed my name to this specification in the presence of two subscribing witnesses.

JOHN SOLTER.

Witnesses:
F. L. MIDDLETON,
CHAS. L. STURTEVANT.